Patented May 28, 1935

2,002,639

UNITED STATES PATENT OFFICE 2,002,639

VULCANIZATION OF RUBBER

Herbert A. Lubs, Wilmington, Del., and Ira Williams, Woodstown, N. J., assignors to E. I. du Pont de Nemours & Company, Wilmington, Del., a corporation of Delaware No Drawing. Application August 23, 1933, Serial No. 686,438

21 Claims. (Cl. 18—53)

This invention relates to the vulcanization of rubber and more particularly to new accelerators of vulcanization.

The use of basic organic materials for accelerating the vulcanization of rubber is old in the art and aromatic amines such as aniline and p-phenylene diamine have been employed commercially. The use of alkyl amines has been very much restricted in general because of the volatility of this class of compounds. U. S. Patent 1,130,903 describes the use of heterocyclic amines such as piperidine and its homologues. This patent also recognizes the fact that piperidine can be converted into solid derivatives such as ureas and dithiocarbamates with good success.

In general, vulcanization in the presence of amines produces a flexible low modulus type of rubber which will withstand long periods of over vulcanization without serious reversion. This type of accelerator is also particularly desirable for use in rubber which is to be vulcanized in heated air because of the preserving action of the accelerator and the dry type of surface imparted to the rubber thereby. Amines which are strongly basic in character are also particularly adapted for the production of thiourea and dithiocarbamate types of accelerators which are generally more stable than other types.

An object of the present invention is to provide a new class of improved accelerators for vulcanization. A further object is to provide such a class of accelerators comprising strongly basic amines which are sufficiently non-volatile so that they can be readily incorporated into rubber without loss due to evaporation. A still further object is to provide such a class of accelerators which comprises such strongly basic amines and also derivatives thereof. Another object is to provide a class of more stable accelerators. A further object is to provide a method whereby the benefits of vulcanization in the presence of a strongly basic amine may be secured. Other objects are to provide new compositions of matter, methods of making the same and to advance the art. Still other objects will appear hereinafter.

These objects may be accomplished in accordance with my invention which comprises treating rubber by incorporating therein, prior to vulcanization, an acid soluble hydrogenation product of carbazole or derivatives thereof and thereafter vulcanizing.

Many hydrogenation products of carbazole are known to exist but not all of them are active accelerators of vulcanization. However, we have found that, when carbazole is hydrogenated to an extent such that at least part of the hydrogenated products are soluble in acetic acid of 10% strength, an active accelerator is produced.

Carbazole may be hydrogenated by any one of a number of methods. One suitable method is by maintaining it in a closed vessel over a nickel catalyst at 150 to 250° C. and 100 to 200 lb. hydrogen pressure for from 2 to 4 hours. Any of the other usual methods of hydrogenation, such as by alcohol and sodium, and the like, may be employed. These and other methods are fully described in the literature and are well known.

The product of such hydrogenation is a very complex mixture, of which all of the various constituents have not been identified. However, we have found that, in substantially every case, there is present at least a small amount of material which is soluble in acetic acid of 10% strength. The proportion of such acid soluble material produced increases with the length of time for which the hydrogenation is allowed to proceed and with increase in the hydrogenation.

These acid soluble products of the hydrogenation of carbazole are very effective accelerators of vulcanization. The other constituents of the hydrogenation have very little or no effect on the vulcanization of rubber. However, we have found that, in certain cases, it is desirable to employ the crude hydrogenation mixture which may contain some free carbazole and carbazole in all stages of hydrogenation.

The most active accelerating fraction may be readily isolated from the hydrogenation mixture by extracting the crude mixture with dilute acetic acid, separating the aqueous solution of amine acetate, and then liberating the amines by the addition of caustic alkali. The amines separate from the alkali solution in a thick paste which is light brown in color and which shows a basic reaction to Clayton yellow. The mixture of amines so produced may be employed, as such, for acceleration of the vulcanization of rubber.

The pasty mixture of acid soluble amines may be further separated into two (2) main constituents, which may be isomers of duo-deca-hydro-carbazole, by dissolving the mixture in gasoline and then adding acetic acid. The acetate of one amine is insoluble in the gasoline and may be removed by filtration. This amine acetate is also a very effective accelerator of the vulcanization of rubber and is only slightly less effective than the free amine. The free amine may be obtained from this acetate by treating it with a solution of caustic alkali. This amine is a white crystalline material melting without further purification at about 60° C. The second amine acetate may be removed from the gasoline by extracting with water. This amine acetate is also a very effective accelerator. When this amine acetate is treated with caustic alkali, an amber colored liquid is obtained which is equal in accelerating properties to the white solid amine described above and will produce derivatives having similar accelerating and physical properties.

In order to illustrate the activity of these materials as accelerators of vulcanization, the following mixes were prepared:

|  | A | B | C |
|---|---|---|---|
| Rubber | 100 | 100 | 100 |
| Carbon black | 25 | 25 | 25 |
| Zinc oxide | 5 | 5 | 5 |
| Sulfur | 3 | 3 | 3 |
| Crude hydrogenation mixture | 1 | | |
| Solid active fraction | | 1 | |
| Liquid active fraction | | | 1 |

These mixes were vulcanized at 287° F. with the results given in the following table:

| Minutes vulcanization at 287° F. | Load at 500% elongation | Tensile at break pounds/in² | Percent elongation at break |
|---|---|---|---|
| A | | | |
| 20 | 1825 | 3900 | 680 |
| 30 | 2075 | 4450 | 700 |
| 45 | 2150 | 4125 | 680 |
| 60 | 2300 | 4275 | 680 |
| B | | | |
| 20 | 2025 | 4075 | 680 |
| 30 | 2250 | 4650 | 700 |
| 45 | 2300 | 4375 | 680 |
| 60 | 2375 | 4250 | 680 |
| C | | | |
| 20 | 1975 | 3975 | 680 |
| 30 | 2100 | 4525 | 700 |
| 45 | 2275 | 4425 | 680 |
| 60 | 2350 | 4375 | 680 |

Various derivatives of the acid soluble amines obtained from hydrogenated carbazole are materially more stable than similar derivatives of other amines which have heretofore been employed as accelerators. Also, the free amines, obtained by me from hydrogenated carbazole, are considerably more active accelerators than other amines heretofore known.

Either one or both of the acid soluble amines may be reacted with organic acids such as acetic acid, substituted dithiocarbamic acids, mercapto-arylenethiazoles, such as mercaptobenzothiazole, or phenolic substances, such as hydroquinone or catechol. Such derivatives will, in each instance, be excellent accelerators for the vulcanization of rubber.

Other derivatives have been prepared such as the carbon disulfide addition products which, in the case of the white solid amine, produces a compound which crystallizes as pale yellow needles and melts at 198° C. This product is relatively stable even in the presence of dilute acetic acid.

Each of these amines may also be treated to form other derivatives, such as the thiuram sulfides, dithiocarbamates, thioureas, and the like which are also effective accelerators of the vulcanization of rubber. Some of these compounds which have been prepared from the white solid amine previously described are the thiuram disulfide which forms pale yellow crystals having a melting point of 122° C.; the thiuram mono-sulfide having a melting point of 110° C.; the product of the sodium salt of the dithio-carbamate reacted with the addition product of hexamethylene tetramine and benzyl chloride which reaction product is a light yellow solid melting at 105 to 109° C.; and the thio-urea resulting from the reaction of phenyl mustard oil with the amine to produce the thio-urea in white crystals having a melting point of 183 to 184° C. Some of the compounds which have been prepared from the liquid amine are the thiuram disulfide which forms pale yellow crystals having a melting point of 122° C.; the thiuram mono-sulfide having a melting point of about 110° C. which melting point is not sharp; and the reaction product of the sodium salt of the dithiocarbamate with the benzyl chloride addition product of hexamethylene tetramine which reaction product is a light yellow solid melting at 104 to 107° C. All of these compounds have proved to be very effective accelerators of the vulcanization of rubber.

The two amines have also been employed in the form of the sodium, lead, zinc, and cadmium dithiocarbamates. These various derivatives of the amines may be readily prepared by any of the usual methods employed for the preparation of such derivatives of other amines. Such methods are fully described in the literature and are well known. In the thioureas, dithiocarbamates and like compounds, the nitrogen of the amine or hydrogenated carbazole will form part of the fundamental structure of the compounds in the same manner as does the nitrogen of other amines such as piperidine and the like.

Also, the mixture of acid soluble amines may be treated with an organic acid, such as acetic acid, substituted dithiocarbamic acids, mercaptobenzo-thiazoles, or phenolic acidic substances such as hydroquinone or catechol, to form salts which are also effective accelerators, the acetate being only slightly weaker than the free amine.

The mixture of acid soluble amines may also be treated with carbon disulfide to produce addition products which are effective accelerators and are relatively stable even in the presence of dilute acetic acid. These carbon disulfide addition products may also be treated, by any of the well known methods, to produce the thiuram disulfides, thiuram mono-sulfides, di-thiocarbamates, thioureas and similar products which are also excellent accelerators.

While we have described the preferred embodiments of my invention together with the methods of producing the new accelerators and the use of certain specific proportions in the rubber mix, it will be readily understood by those skilled in the art that many variations and modifications may be made in the compounds, methods of producing the same, proportions employed and the constitution of the rubber mixes in which they are employed without departing from the spirit of my invention. Accordingly, the scope of our invention is to be limited solely by the appended claims construed as broadly as is permissible in view of the prior art.

We claim:

1. The method of treating rubber which comprises incorporating therein prior to vulcanization products obtainable by hydrogenating carbazole until at least part of the hydrogenated carbazole is soluble in acetic acid of 10% strength.

2. The method of treating rubber which comprises incorporating therein prior to vulcanization the acetic acid soluble products obtainable by hydrogenating carbazole until at least part of the hydrogenated carbazole is soluble in acetic acid of 10% strength.

3. The method of treating rubber which comprises incorporating therein prior to vulcanization the acetic acid soluble solid amine obtainable by hydrogenating carbazole until at least part of the hydrogenated carbazole is soluble in acetic acid of 10% strength.

4. The method of treating rubber which comprises incorporating therein, prior to vulcanization, the solid product obtainable by hydrogenating carbazole until at least part is soluble in acetic acid of 10% strength, extracting the hydrogenation mass with dilute acetic acid, adding caustic to the acetic acid extract, and separating the solid product.

5. The method of treating rubber which comprises incorporating therein, prior to vulcanization, the solid product obtainable by hydrogenating carbazole until at least part is soluble in acetic acid of 10% strength, extracting the hydrogenation mass with dilute acetic acid, adding caustic to the acetic acid extract, separating the solid, dissolving the solid in gasoline, adding acetic acid to the solution, and separating the solid product.

6. The method of treating rubber which comprises incorporating therein, prior to vulcanization, the solid product obtainable by hydrogenating carbazole until at least part is soluble in acetic acid of 10% strength, extracting the hydrogenation mass with dilute acetic acid, adding caustic to the acetic acid extract, separating the solid, dissolving the solid in gasoline, adding acetic acid to the solution, separating the solid material, treating this solid material with caustic, and separating the solid product.

7. Rubber obtained by vulcanizing the product of claim 1.

8. Rubber obtained by vulcanizing the product of claim 2.

9. Rubber obtained by vulcanizing the product of claim 3.

10. Rubber obtained by vulcanizing the product of claim 5.

11. Rubber obtained by vulcanizing the product of claim 6.

12. The method of treating rubber which comprises incorporating therein prior to vulcanization a member of the group consisting of acetic acid soluble amines obtainable by hydrogenating carbazole until at least part of the hydrogenated carbazole is soluble in acetic acid of 10% strength, the acetic acid salts of such amines, the substituted dithiocarbamic acid salts of such amines, the mercaptoarylenethiazole salts of such amines, and the thiuram disulfides, thiuram monosulfides, dithiocarbamates and thio-ureas derived from such amines.

13. The method of treating rubber which comprises incorporating therein prior to vulcanization a member of the group consisting of acetic acid soluble solid amine obtainable by hydrogenating carbazole until at least part of the hydrogenated carbazole is soluble in acetic acid of 10% strength, the acetic acid salts of such amine, the substituted dithiocarbamic acid salts of such amine, the mercaptoarylenethiazole salts of such amine, and the thiuram disulfides, thiuram monosulfides, dithiocarbamates and thio-ureas derived from such amine.

14. Rubber obtainable by vulcanizing the product of claim 12.

15. Rubber obtainable by vulcanizing the product of claim 13.

16. The method of treating rubber which comprises incorporating therein prior to vulcanization the acetic acid soluble liquid amine obtainable by hydrogenating carbazole until at least part of the hydrogenated carbazole is soluble in acetic acid of 10% strength.

17. The method of treating rubber which comprises incorporating therein, prior to vulcanization, the liquid product obtainable by hydrogenating carbazole until at least part is soluble in acetic acid of 10% strength, extracting the hydrogenation mass with dilute acetic acid, adding caustic to the acetic acid extract, separating the solid, dissolving the solid in gasoline, adding acetic acid to the solution, and separating the solid product, extracting the gasoline solution with water, treating the water solution with caustic alkali, and then separating the liquid amine from the water.

18. The method of treating rubber which comprises incorporating therein prior to vulcanization the dithiocarbamates obtainable by reacting with carbon disulfide on the acetic acid soluble amines obtainable by hydrogenating carbazole until at least part of the hydrogenated carbazole is soluble in acetic acid of 10% strength.

19. Rubber obtained by vulcanizing the product of claim 16.

20. Rubber obtained by vulcanizing the product of claim 17.

21. Rubber obtained by vulcanizing the product of claim 18.

HERBERT A. LUBS.
IRA WILLIAMS.